March 9, 1943.  R. C. BERGVALL  2,313,118
ELECTRICAL PROTECTIVE DISTRIBUTION SYSTEM
Filed Aug. 9, 1941    2 Sheets-Sheet 1

INVENTOR
Royal C. Bergvall.
BY
ATTORNEY

March 9, 1943.   R. C. BERGVALL   2,313,118
ELECTRICAL PROTECTIVE DISTRIBUTION SYSTEM
Filed Aug. 9, 1941   2 Sheets-Sheet 2

WITNESSES:

INVENTOR
Royal C. Bergvall.
BY
ATTORNEY

Patented Mar. 9, 1943

2,313,118

UNITED STATES PATENT OFFICE 2,313,118

ELECTRICAL PROTECTIVE DISTRIBUTION SYSTEM

Royal C. Bergvall, Forest Hills, Pa., assignor to Westinghouse Electric & Manufacturing Company, East Pittsburgh, Pa., a corporation of Pennsylvania Application August 9, 1941, Serial No. 406,136

17 Claims. (Cl. 175—294)

This invention relates to electrical distribution systems, and it has particular relation to electrical distribution systems designed to be supplied with electrical energy from multiple sources.

In order to provide good voltage regulation and to assure continuity of service, it is the practice to supply electrical energy to an electrical distribution system from multiple sources of electrical energy. Such sources may include a plurality of transformers having their secondary windings connected in parallel to a common distribution circuit. It should be noted that if the connection of each transformer to the entire distribution circuit is controlled by a single transformer circuit breaker, optimum performance of the system is not obtained. For example, if a fault should occur on the common distribution circuit, all transformer circuit breakers must trip in order to clear the fault. The resulting discontinuity of service is objectionable.

A further example of an electrical distribution system supplied with energy from a plurality of sources is that known as the network distribution system. In such a system, a common network circuit or grid is supplied with electrical energy from a plurality of feeder circuits. Each of the feeder circuits is connected to the network circuit through a plurality of network transformers and network protectors. As well understood in the art, each network protector usually is directionally controlled to trip only for faults occurring on the associated feeder circuit. When a fault occurs on a feeder circuit, the associated network protectors trip to disconnect the faulty feeder circuit from the network circuit. The network circuit then continues to receive energy from the remaining feeder circuit or circuits without interruption in service. However, if a fault occurs on the network circuit all network protectors remain closed and the fault is burned clear by the large currents available from all feeder circuits.

Although the network distribution system has proven to be extremely satisfactory for supplying electrical energy to areas having a high load density, modifications of the system are required for certain applications. For example, in primary network distribution systems operating at high voltage the current available from the high voltage circuits may not be sufficient to burn clear faults occurring on a network circuit or grid. For this reason, auxiliary sectionalizing switches are employed to remove faulty portions of a network circuit or grid from service. Such a system is disclosed in the Parsons Patents 1,947,100 and 1,955,311. Although such a system is highly satisfactory, elements of cost and complexity have restricted its application.

A somewhat similar difficulty is encountered in the application of the low voltage secondary network distribution system to medium and low density areas. In such areas the current available from the feeder circuit supplying energy to the network circuit may be insufficient to burn clear network circuit faults. For such applications, a simple and inexpensive sectionalizing system is desirable.

In accordance with the invention, a distribution circuit is supplied with electrical energy from a plurality of sources of electrical energy each connected to the circuit through a main circuit breaker. The distribution circuit is provided with a plurality of sectionalizing circuit breakers for segregating portions of the distribution circuit connected to different sources of electrical energy. The main and sectionalizing circuit breakers are arranged in groups, each including one main circuit breaker and one or more adjacent sectionalizing circuit breakers. The sectionalizing circuit breakers of each group are arranged to trip in advance of the tripping of the associated main circuit breaker. Consequently, the main circuit breaker remains closed unless the associated sectionalizing circuit breakers fail to clear the condition responsible for their tripping. Preferably, the circuit breakers of each group are controlled by a single variable quantity such as the current supplied by the associated source of electrical energy.

If the main circuit breaker must operate not only for faults occurring on the distribution circuit but for faults occurring on the associated source of electrical energy or feeder circuit, each main circuit breaker may be provided with a directional control. Such a directional control operates to trip a main circuit breaker if the direction of energy flow therethrough reverses. Preferably, this tripping occurs independently of the tripping of the sectionalizing circuit breakers. For such systems, it generally is desirable to provide each main circuit breaker with reclosing mechanism operating only for a tripping of a main circuit breaker initiated by the directional control device.

The invention further contemplates the inclusion of a plurality of circuit breakers, such as a main circuit breaker and a sectionalizing circuit breaker with a transformer in a common casing. By incorporating a control for one or more of the circuit breakers dependent on the temperature of the transformer, and by providing surge protection and high voltage links for the transformer, an extremely versatile and efficient transformer unit is obtained.

It is, therefore, an object of the invention to provide a plurality of circuit breakers with means for sequentially operating the circuit breakers in a predetermined sequence.

It is a still further object of the invention to provide a distribution circuit with a plurality of sectionalizing circuit breakers and a plurality of feeder circuit breakers having means for tripping each feeder circuit breaker only after tripping of the adjacent sectionalizing circuit breaker or breakers.

It is another object of the invention to provide a plurality of transformers each having a secondary winding connected through a transformer circuit breaker into a common distribution circuit and a plurality of sectionalizing circuit breakers for sectionalizing the distribution circuit between each pair of transformer circuit breakers, the sectionalizing circuit breaker or breakers adjacent each transformer circuit breaker being arranged to trip in advance of tripping of the associated transformer circuit breaker.

It is another object of the invention to provide a network distribution system having interconnected secondary mains provided with sectionalizing circuit breakers and having transformer circuit breakers connected to the points of intersection of the secondary mains, the sectionalizing circuit breakers adjacent each transformer circuit breaker being tripped in response to current flowing through the transformer circuit breaker.

It is still another object of the invention to provide a transformer unit having included therein a plurality of circuit breakers together with complete means for protecting the transformer.

Other objects of the invention will be apparent from the following description taken in conjunction with the accompanying drawings, in which.

Figure 1:
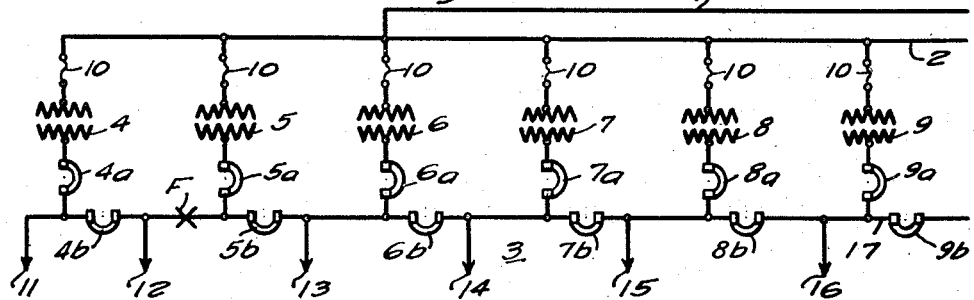
Figure 1 is a schematic view in single line of a distribution system embodying the invention.

Referring to the drawings, Figure 1 shows a distribution system supplied with electrical energy from a single source 1 of electrical energy which is connected to a branch feeder circuit or bus 2. Although the invention is applicable to systems employing alternating or direct current and to systems energized by polyphase or single phase energy, it is assumed for the purpose of discussion that Fig. 1 represents a single phase alternating current system.

As shown in Fig. 1, the branch feeder circuit or bus 2 is connected to a distribution circuit 3 through a plurality of transformers 4 to 9, each having a primary winding connected to the branch feeder circuit or bus. If desired, fuses 10 may be provided between each primary winding and the branch feeder circuit or bus 2.

The distribution circuit 3 includes a plurality of load circuits 11 to 16 which are interconnected by a suitable tie circuit 17. Each of the transformers has its secondary winding connected to the distribution circuit through a separate main or transformer circuit breaker 4a to 9a. By inspection of Fig. 1, it will be observed that the transformers 4 to 9 are connected in parallel for the purpose of energizing the distribution circuit 3.

In order to increase the flexibility of the system illustrated in Fig. 1, the tie circuit 17 is sectionalized by means of sectionalizing circuit breakers positioned between the points of connection of the transformers to the distribution circuit. In the specific embodiment of Fig. 1, each of the transformer circuit breakers 4a to 9a has associated therewith a sectionalizing circuit breaker 4b to 9b.

Each sectionalizing breaker is desired to trip in advance of its associated transformer breaker. For example, the sectionalizing circuit breaker 4b is designed to trip in advance of the transformer circuit breaker 4a. In an analogous manner, the sectionalizing circuit breaker 5b is designed to trip in advance of the transformer circuit breaker 5a.

With this brief description of the system of Fig. 1 in mind, it is believed that a description of the operation of the system will assist in an understanding of the invention. It will be assumed first that the system of Fig. 1 is in normal operation with all of the circuit breakers closed. Should a fault F occur on the distribution circuit, as indicated adjacent the load circuit 12, an excessive current flows through the adjacent transformers 4 and 5. Since the sectionalizing circuit breaker 4b is designed to trip in advance of the transformer circuit breaker 4a, the sectionalizing circuit breaker is the first of these two breakers to open. The opening of the sectionalizing circuit breaker 4b relieves the transformer 4 of the excessive burden imposed by the fault F. Consequently, the transformer circuit breaker 4a remains closed, and the transformer 4 continues to supply electrical energy to the load circuit 11 without interruption.

The excessive current flowing through the transformer 5 tends to trip the associated transformer circuit breaker 5a. However, because of the correlation between the tripping of this circuit breaker and that of the associated sectionalizing circuit breaker 5b, the sectionalizing circuit breaker 5b is the first to trip. This disconnects the fault F from the portion of the distribution circuit to the right of the sectionalizing circuit breaker 5b as viewed in Fig. 1. Consequently, the transformers 6 to 9 continue to supply current to the loads 13 to 16 without interruption.

By inspection of Fig. 1, it will be noted that tripping of the sectionalizing circuit breaker 5b does not affect the connection between the fault F and the transformer circuit breaker 5a. Consequently, the circuit breaker 5a trips to disconnect the transformer 5 from the fault F and from the associated load circuit 12. This means that the entire distribution circuit 3 with the exception of the load circuit 12 continues to receive electrical energy without interruption. To assure proper functioning of this system, it is desirable that the tripping of the various circuit breakers be effected with time delay and preferably with inverse time delay.

To illustrate the desirability of the sectionalizing circuit breakers, let it be assumed that such circuit breakers are not provided. If the loads on the load circuits 13 and 14 are heavy, the resulting burden on the adjacent transformer 6 after the circuit breaker 5a trips may be sufficient to trip the transformer circuit breaker 6a. This tripping of the transformer circuit breaker 6a would transfer the excessive load to the next transformer 7. The tripping of the transformer circuit breaker 7a in response to this excessive burden would in turn transfer an excessive burden to the transformer 8. This continued transfer or "cascade" effect would continue until all of the transformer circuit breakers 6a to 9a had tripped with a resulting termination of service to the load circuits 13 to 16.

The cascade tripping of the circuit breakers 6a to 9a is prevented by operation of the associated sectionalizing circuit breakers. If the loads on the load circuits 13 and 14 are heavy, the sectionalizing circuit breaker 6b must trip in advance of the transformer circuit breakers 6a. This relieves the transformer 6 of the load circuit 14 and the transformer continues to supply electrical energy to the load circuit 13 without interruption. Consequently, by operation of the sectionalizing circuit breakers, a reasonably satisfactory distribution of load is assured for the system.

Figure 2:
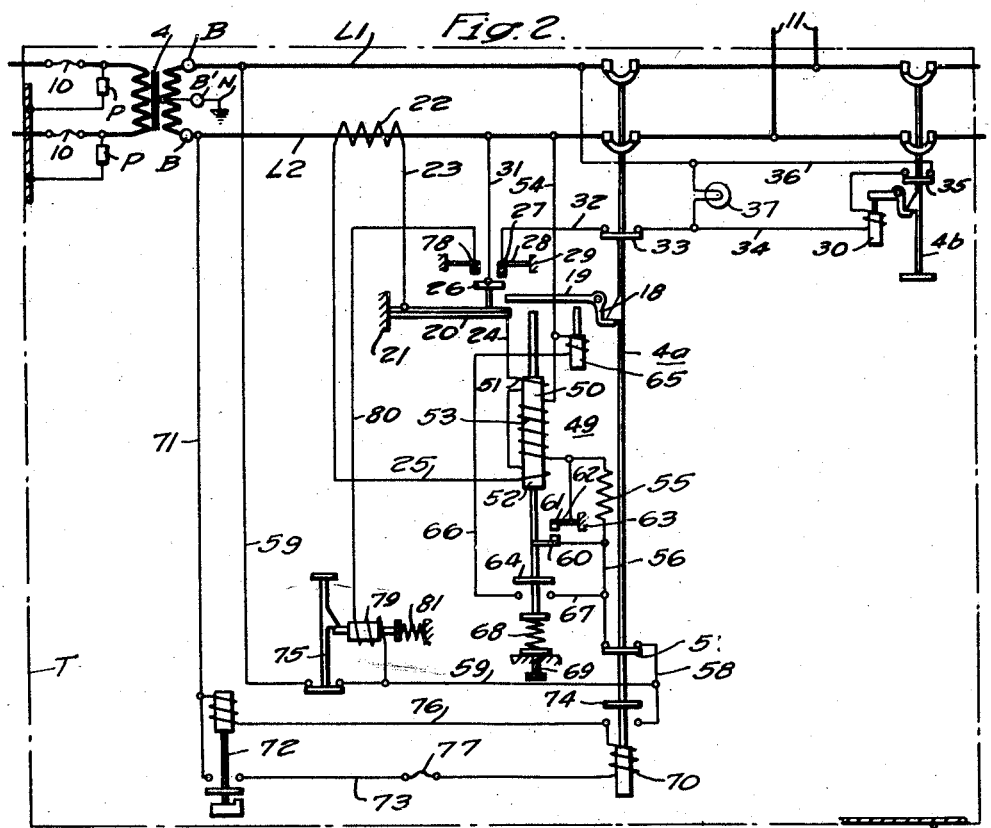
Fig. 2 is a schematic view of a circuit breaker or distribution unit suitable for the system of Fig. 1.

Although each sectionalizing circuit breaker may be displaced appreciably from its associated transformer circuit breaker, preferably they are located adjacent each other and conveniently they may be included in the same transformer housing. A suitable construction for these circuit breakers and their control circuits are illustrated in Fig. 2. Since each group comprising a transformer circuit breaker and its sectionalizing circuit breaker is similar to the remaining groups, a description of one of the groups such as that including the circuit breakers 4a and 4b will suffice.

In Fig. 2, the transformer 4 has its secondary winding connected to the circuit breakers 4a and 4b and to the load circuit 11 through conductors L1 and L2. The transformer circuit breaker 4a is provided with a tripping latch 18 having a tripping arm 19 extending therefrom. This tripping arm extends into the path of a suitable tripping element which may take any of several forms. In the specific embodiment of Fig. 2, the tripping element is a bimetallic element 20 having one end attached to a fixed support 21 and having its free end positioned beneath the arm 19. As the temperature of the bimetallic element 20 rises, the free end thereof moves upwardly as viewed in Fig. 2 to engage the arm 19 and trip the transformer circuit breaker 4a.

The temperature of the bimetallic element 20 may be controlled in any desirabled manner in accordance with a suitable quantity such as current or energy. For example, current may be passed directly through the bimetallic element 20 from the secondary winding 22 of a current transformer which is associated with the conductor L2. The path for current flowing through the bimetallic element may be traced from one terminal of the secondary winding 22, through a conductor 23, the bimetallic element 20, a conductor 24 and a conductor 25 back to the remaining terminal of the secondary winding 22. From this brief description, it will be understood that the temperature of the bimetallic element 20 and consequently the movement of the free end thereof are controlled by current flowing through the transformer 4.

As previously pointed out, it is desirable that the sectionalizing circuit breaker 4b trip in advance of the tripping of the transformer circuit breaker 4a. For this purpose, the bimetallic element 20 may carry a contact 26 which moves with the free end of the bimetallic element. A tripping contact 27 is positioned in the path of movement of the contact 26 for controlling the tripping of the sectionalizing circuit breaker 4b. Conveniently the tripping contact 27 may be mounted on a resilient spring arm 28 which has one end attached to a fixed support 29. Engagement of the contacts 26 and 27 establishes a tripping circuit for a tripping solenoid 30 associated with the sectionalizing circuit breaker 4b. This tripping circuit may be traced from the conductor L2, through a conductor 31, the contact 26, the contact 27, a conductor 32, front contacts of a pallet switch 33, a conductor 34, the coil of the tripping solenoid 30, front contacts of a pallet switch 35 and a conductor 36 to the conductor L1. The relationship of the parts is such that the contacts 26 and 27 engage prior to the actuation of the latch 18 by the bimetallic element 20. Consequently, the sectionalizing circuit breaker 4b must trip in advance of the tripping of the transformer cricuit breaker 4a.

As previously indicated, the sectionalizing circuit breaker 4b desirably is provided with a time delay which is preferably of the inverse time type. Such a time delay inherently is provided by the bimetallic element 20. A brief consideration of the operation of the bimetallic element 20 reveals that the sectionalizing circuit breaker must trip with less time delay than that of the transformer circuit breaker 4a. Moreover, the tripping of the sectionalizing circuit breaker 4b occurs at a smaller current value than that of the transformer circuit breaker 4a. For this reason a signalling device such as a lamp 37 may be connected in parallel with the tripping solenoid 30 to indicate that the transformer 4 is overloaded prior to actual tripping of the transformer circuit breaker 4a. With such a construction, engagement of the contacts 26 and 27 not only trips the sectionalizing circuit breaker 4b but energizes the lamp 37. It also may be pointed out that the mechanical relationship of the bimetallic element 20, the arm 19 and the contact 27 requires initial tripping of the sectionalizing circuit breaker 4b. This means that an excessive current flowing through the transformer 4 will not result in simultaneous tripping of the two circuit breakers.

Figures 3, 4:
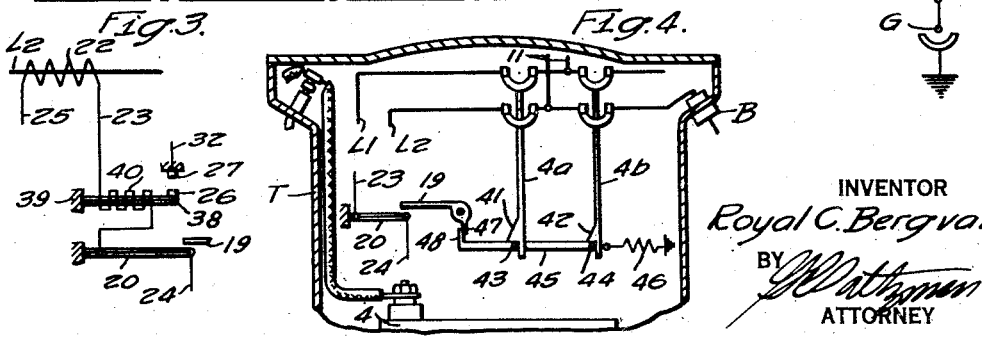
Fig. 3 is a schematic detail view showing a modification of a unit illustrated in Fig. 2.
Fig. 4 is a schematic detail view showing a further modification of the unit of Fig. 2.

As previuosly pointed out, the construction adopted for controlling the tripping of the circuit breakers may vary appreciably. For example, the contact 26 may be actuated by a separate bimetallic element 38 (Fig. 3) which has one end attached to a fixed support 39. This bimetallic element may be heated in any suitable manner as by a separate resistance heater 40. As shown in Fig. 3, the resistance heater 40 is connected in series with the secondary winding 22 of the current transformer and with the bimetallic element 20 for energization by the same current. The bimetallic elements 30 and 20 are so correlated that the bimetallic element 38 operates to close the contacts 26 and 27 prior to a tripping engagement of the bimetallic element 20 with the arm 19.

A still further modification of the tripping mechanism is illustrated in Fig. 4, wherein the circuit breakers 4a and 4b are provided with latching lugs 41 and 42, respectively. These lugs engage latch pins 43 and 44 which are carried by a trip rod 45. A spring 46 is provided for biasing the trip rod 45 towards latching position. In Fig. 4, the arm 19 is associated with a lever 47 to form a bell crank. Movement of the bimetallic element 20 to tripping position operates through the arm 19 to rotate the lever 47 against a lip 48 carried by the trip rod 45. Such operation serves to move the trip rod 45 to the left, as viewed in Fig. 4. By inspection of the proportions of the lugs 41 and 42, it will be noted that the latch pin 44 clears the lug 42 before the latch pin 43 can clear the lug 41. Consequently, the sectionalizing circuit breakers 4b must trip in advance of the sectionalizing breaker 4a. After the tripping of the sectionalizing breaker 4b continued movement of the trip rod 45 to the left carries the pin 43 clear of the lug 41 and permits the transformer circuit breaker 4a to trip.

With the constructions illustrated in Figs. 2, 3 and 4, it should be observed that failure of the sectionalizing circuit breaker 4b to trip does not interfere with tripping of the transformer circuit breaker 4a.

In certain cases it may be desirable to provide the transformer circuit breakers with trip means for promptly tripping a transformer circuit breaker when a fault occurs on the associated feeder circuit. For this purpose, a suitable directional element may be provided. Such an element is illustrated in Fig. 2.

The directional element may take the form of a directional relay 49 having a magnetic core 50 which may be formed of laminated soft iron. This core is provided with two current windings 51 and 52 which are wound in opposite directions and which are positioned to move the core in opposite directions. Consequently, if current is passed in series through these windings, the magnetomotive forces developed thereby are in opposition and no movement of the core 50 results. The windings 51 and 52 may be included in a series circuit with the bimetallic element 20 for energization from the secondary winding 22 of the current transformer. Because of the opposed windings 51 and 52, energization of these windings alone has no effect on movement of the magnetic core 50.

Movement of the magnetic core 50 is determined by the coaction between the windings 51 and 52 and a voltage winding 53 which is disposed between the windings 51 and 52. This winding 53 is energized by a circuit which may be traced from the conductor L2, through a conductor 54, the voltage winding 53, an impedance 55, a conductor 56, front contacts of a pallet switch 57, a conductor 58 and a conductor 59 to the conductor L1. Although the windings 51 and 52 could be energized in accordance with voltage and the winding 53 energized in accordance with current, for the purpose of discussion it will be assumed that the windings 51 and 52 are current windings and the winding 53 is a voltage winding, as above indicated.

Depending upon the direction of current flow through the voltage winding 53, the magnetomotive force developed by the winding 53 opposes either the magnetomotive force of the current winding 51 or that of the current winding 52. For example, let it be assumed that energy flows in a normal direction to the transformer 4 at unity power factor, and that the current flowing through the voltage winding 53 is in phase with that flowing through the current windings 51 and 52. The windings are so related that under these conditions the magnetomotive force developed by the winding 53 opposes that developed by the current windings 51 and the resultant magnetomotive force tends to draw the magnetic core 50 in a downward direction, as viewed in Fig. 2. If the current relationships are as indicated, the characteristic developed by the relay 49 is substantially a watt characteristic. If other characteristics are desired, these may be obtained readily by proper selection of the nature and value of the impedance 55. By proper selection of this impedance, the phase relationships between the currents passing through the windings 51, 52 and 53 may be adjusted as desired relative to a given power factor of the energy flowing through the transformer 4.

When the direction of energy flow reverses in the transformer 4, the direction of flow of current through the current windings 51 and 52 reverses relative to the current passing through a voltage winding 53. As a result of this reversal, the magnetomotive force developed by the voltage winding 53 opposes that developed by the current winding 52 and the resultant magnetomotive force urges the magnetic core 50 in an upward direction, as viewed in Fig. 2, to trip the latch 18.

Under certain conditions, the voltage available adjacent the transformer 4 may be extremely low and the resulting force available for actuating the magnetic core 50 may be correspondingly low. Under these circumstances, it may be desirable to provide means for increasing the force developed by the windings 51, 52 and 53. Such an increase may be provided by establishing a shunt circuit around the impedance 55. To this end a contact 60 may be mounted on the magnetic core 49 for movement therewith. In the path of movement of this contact 60, a second contact 61 is positioned. The contact 61 may be supported on a resilient spring arm 62 which has one end attached to a fixed support 63. A slight movement of the magnetic core 50 in an upward direction brings the contact 60 into engagement with the contact 61 to establish a shunt circuit for the impedance 55. Consequently, the current passing through the voltage winding 53 is increased substantially for the remaining travel of the magnetic core 50 and sufficient torque is assured for directly tripping the latch 18. During this further movement of the magnetic core 50, the spring arm 62 yields to permit such movement.

Since the relay 49 is a directional relay, it may also be employed for overload protection. For this purpose, the magnetic core 50 may carry a bridging contact 64 having back contacts arranged to establish a tripping circuit for an auxiliary tripping solenoid 65. This tripping circuit may be traced from the conductor L2, through the conductor 54, the winding of the auxiliary tripping solenoid 65, a conductor 66, the contacts of the bridging contact 64, a conductor 67, front contacts of the pallet switch 57, the conductor 58 and a conductor 59 to the conductor L1. A spring 68 may be employed for biasing the magnetic core in a predetermined position with the bridging contact 64 spaced from its back contacts. When an overload occurs on the transformer 4, the resulting force operating on the magnetic core 50 urges the magnetic core downwardly against the resistance of the spring 68 to bring the bridging contact 64 into tripping engagement with its back contacts. A suitable adjusting device for the spring 68, such as a machine screw 69, may be employed for varying the overload response of the relay 49.

When a directional relay such as the relay 49 is employed, it often is desirable that the transformer circuit breaker 4a reclose after a tripping operation initiated by the directional relay 49, but that the transformer circuit breaker remain open for a tripping operation initiated by the bimetallic element 20. The desired reclosure may be provided by a closing motor or solenoid 70 associated with the transformer circuit breaker 4a. A closing circuit for this solenoid may be traced from the conductor L2, through a conductor 71, front contacts of a closing relay 72, a conductor 73, the winding of the closing solenoid 70, back contacts of a pallet switch 74, the conductor 58, the conductor 59 and front contacts of a lockout relay 75 to the conductor L1. From an inspection of this circuit, it will be noted that operation of the closing solenoid 70 requires closure both of the closing relay 72 and of the lockout relay 75.

The closing relay 72 is energized by a circuit which may be traced from the conductors L2, through the conductor 71, the energizing winding of the closing relay 72, a conductor 76, the back contacts of the pallet switch 74, the conductor 58, the conductor 59 and the front contacts of the lockout relay 75 to the conductor L1. Consequently, the closing relay 72 is energized in accordance with the voltage across the conductors L1 and L2. When this voltage reaches a predetermined value, such as 90% of its normal value, the closing relay 72 may be designed to pick up and close its contacts. Preferably, the closing relay is provided with a time delay in its closing direction to prevent immediate reclosure of the circuit breaker following a tripping operation thereof.

If the transformer circuit breaker 4a trips in response to a permanent fault, the transformer circuit breaker would tend to continue tripping and reclosing indefinitely. To prevent this "pumping" operation of the transformer circuit breaker, a fuse 77 may be included in series with the winding of the closing solenoid 70. This fuse has a thermal characteristic such that it permits a predetermined number of immediately successive tripping and reclosing operations of the transformer circuit breaker. However, if the number of immediately successive tripping and reclosing operations exceeds the predetermined number, the fuse 77 blows to prevent further reclosing of the transformer circuit breaker.

If it is desired that the transformer circuit breaker 4a reclose only for tripping operations initiated by the directional relay 49, the lockout relay 75 may be designed to drop out and open its contacts when the bimetallic element 20 trips the transformer circuit breaker 4a. For this purpose, a contact 78 may be positioned in the path of movement of the contact 26 for engagement thereby as the bimetallic element 20 trips the latch 18. It should be noted that the contact 26 engages the contact 27 prior to its engagement with the contact 78. Engagement of the contacts 26 and 78 establishes an energizing circuit for a solenoid 79 associated with the lockout relay 75. This circuit may be traced from the conductor L2, through the conductor 81, the contacts 26 and 78, a conductor 80, the winding of the solenoid 79, the front contacts of the lockout relay 75 and the conductor 59 to the conductor L1. The solenoid 79 has its core normally urged into latching engagement with the relay 75 by means of a spring 81. Energization of the winding of the solenoid 79 retracts the core from its latching engagement and permits the lockout relay 75 to drop and open its contacts. The resulting opening of the lockout relay contacts prevents energization of the closing solenoid 70. Consequently, a tripping operation initiated by the bimetallic element 20 prevents reclosure of the transformer circuit breaker 4a.

The physical arrangement of the parts illustrated in Fig. 2 may vary appreciably. Preferably, the transformer 4, the transformer circuit breaker 4a and its control elements are mounted in a common tank or housing T, indicated in Fig. 2 by broken lines and in Fig. 4. With such a construction, the circuit breaker contacts and the bimetallic element 20 may be immersed in the oil or other insulating medium employed for the transformer 4. A suitable construction of the type is illustrated in the Putman Patent 2,223,531. This patent discloses a suitable construction for a bimetallic element control device suitable for first establishing contact for a signal device, such as the lamp 37 of Fig. 2, and subsequently tripping a latch similar to the latch 18 of Fig. 2.

Preferably, the sectionalizing circuit breaker 4b also is included with the transformer circuit breaker 4a and the transformer 4 in the common housing T. Such a construction provides a compact unit and permits the poles of the circuit breaker 4b to be immersed in the oil or other insulating medium of the transformer 4.

The inclusion of both circuit breakers 4a and 4b in a common housing permits the extension in a single compact unit of the coordinated transformer protection disclosed in the Hodnette Patent 2,066,935. By immersing the bimetallic element 20 in the transformer oil or other insulating medium, the element responds not only to heavy overloads but to excessive continuous heating of the transformer. In addition surge protectors P may be provided for the high voltage terminals of the transformer, and the transformer case, if insulated from ground, may be grounded through a suitable spark gap G. The secondary bushings may be protected by suitable surge protectors B and if a neutral conductor is provided, its bushing may be protected by an additional protector B'. A more detailed description of these protectors may be found in the aforesaid Hodnette patent.

In addition to the coordinated protection afforded by the protectors P, B and B', the gap G and the circuit breaker 4a as outlined in the aforesaid Hodnette patent, the circuit breaker 4b serves to decrease the load on the transformer prior to any operation of the circuit breaker 4a. This tends to maintain the transformer 4 in limited service for certain conditions wherein the transformer otherwise would be completely removed from service. Since all of this protective equipment is carried by a common housing T, a single unit installation provides complete service and protection.

In certain cases the poles of the circuit breakers 4a and 4b may be above the surface of the insulating medium in the housing T to decrease sludging of the insulating medium. For other applications, particularly for small capacity transformers and circuit breakers, one or both circuit breakers may have poles immersed in the insulating medium. The insulating medium then assists in extinguishing arcs during operation of the circuit breakers.

Generally, when the transformers are employed in banks, as illustrated in Fig. 1, the directional relay 49 and the reclosing mechanism for the transformer circuit breaker 4a are not required. However, in certain cases, as those in which the feeder circuits are connected to different sources of energy, the directional relay and reclosing mechanism may be extremely desirable. A system of this type is illustrated in Fig. 5.

Figure 5:
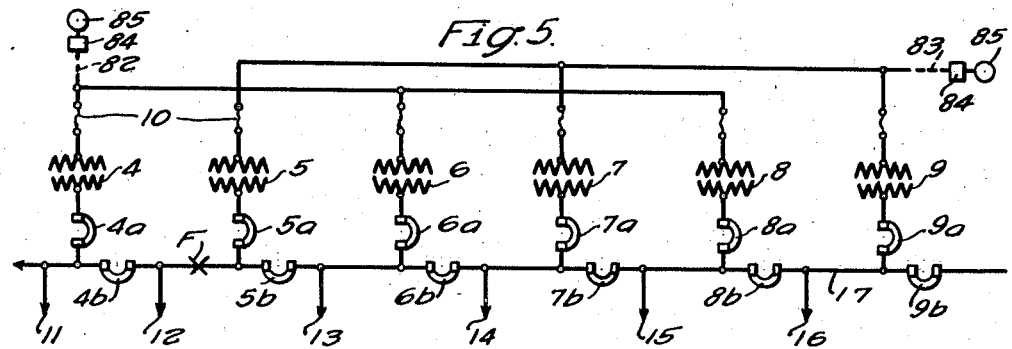
Fig. 5 is a schematic single line view showing a modification of the system illustrated in Fig. 1.

Referring to Fig. 5, the transformers, circuit breakers and load circuits of Fig. 1 are shown connected to two feeder circuits 82 and 83. In the specific embodiment illustrated, the transformers 4, 6 and 8 are connected to the feeder circuit 82, whereas the transformers 5, 7 and 9 are connected to the feeder circuit 83. The feeder circuits may be connected to a common source of energy through different routes. As shown, however, each feeder circuit is connected through a feeder circuit breaker 84 to a separate source of energy 85. As a matter of fact, each feeder circuit may be considered to be an energizing source for the load circuits. Since the load circuits of Fig. 5 may be energized from either of the feeder circuits, upon the occurrence of a fault on one of the feeder circuits it is desirable that only the faulty feeder circuit be removed from service, and that the remaining feeder circuit together with the associated transformers remain in service. The provision of suitable directional relays which conveniently may be similar to the relay 49 of Fig. 2, facilitates such operation of the system.

In practice, it has been found that a large proportion of the faults occurring on the feeder circuits, particularly feeder circuits of the overhead type, are selfclearing. For this reason, it is desirable that after the transformer circuit breakers associated with a faulty feeder circuit have tripped that these circuit breakers reclose. For such operation, each transformer circuit breaker desirably may include the reclosing mechanism illustrated in Fig. 2.

From the foregoing discussion it is believed that the operation of the system illustrated in Fig. 5 is clear. Let it be assumed that the system is operating normally and receiving energy from both feeder circuits 82 and 83. If a fault occurs on one of the feeder circuits, such as the feeder circuit 82, the direction of energy flow reverses through the transformers 4, 6 and 8 associated with the faulty feeder circuit. By operation of the directional relays associated with the transformer circuit breakers 4a, 6a and 8a, these circuit breakers trip to disconnect the faulty feeder circuit 82 from the load circuits. Preferably this tripping is accomplished with substantially less time delay than that required for a tripping operation of the sectionalizing circuit breakers 4b to 9b. As a matter of fact, it is desirable in most cases that the directional relay 49 trip substantially instantaneously. Such instantaneous tripping precludes any possibility of a tripping operation of the sectionalizing circuit breakers. Moreover, instantaneous trippings by the directional relays prevent substantial heating of the bimetallic elements 20 associated with the various circuit breakers. Consequently, these bimetallic elements are fully available for subsequent selective operation.

At the same time the feeder circuit breaker 84 associated with the faulty feeder circuit 82 trips to deenergize the feeder circuit. The feeder circuit breaker 84 may be of the conventional reclosing type which recloses a predetermined number of times and then locks out in the event that the fault is of a permanent nature. If the fault clears before the termination of the reclosing cycle of the feeder circuit breaker 84, the feeder circuit breaker closes and remains closed to energize the feeder circuit 82. Thereafter the closing relay 72 associated with each of the transformer circuit breakers 4a, 6a and 8a closes its contacts to initiate a reclosing operation of the associated circuit breakers. The transformer circuit breakers 4a, 6a and 8a thereupon close to restore the complete system for normal operation.

If the fault on the feeder circuit 82 is of a permanent nature, its feeder circuit breaker 84 goes through its reclosing cycle and locks out. The transformer circuit breakers 4a, 6a and 8a under these circumstances remain open and the load circuits are connected for operation only to the feeder circuit 83.

Let it be assumed next that the fault F occurs on the tie circuit 17. If the directional relays are provided with overload contacts, such as that represented by the bridging contact 64, and if the fault currents are sufficiently large to actuate the directional relays in the overload direction, the transformer circuit breakers trip promptly to clear the distribution circuit. However, for the purpose of this discussion it will be assumed that the directional relays employed in the system of Fig. 5 do not have such overload contacts.

As a result of the fault F, fault currents flow which are largest in the nearest transformer circuit breakers 4a and 5a. These fault currents heat the associated bimetallic elements. Since the bimetallic elements have inverse time delay, the bimetallic elements of the transformer circuit breakers 4a, 5a are the first to close their contacts 26 and 17 to trip the associated sectionalizing circuit breakers 4b and 5b. The tripping of the sectionalizing circuit breaker 4b disconnects the transformer circuit breaker 4a from the fault F. Consequently, the transformer circuit breaker 4a remains in service to supply the load circuit 11.

Since the transformer circuit breaker 5a still is connected to the fault F, the fault currents flowing therethrough continue to urge the bimetallic element associated therewith into tripping engagement with the arm 19 of the latch 18, thereby tripping the transformer circuit breaker 5a. At the same time, the contacts 26 and 78 engage to trip the associated lockout relay 75 and prevent reclosure of the transformer circuit breaker 5a. Consequently, the transformer circuit breaker 5a remains out of service until the fault F is repaired and the transformer circuit breaker 5a is manually restored to service. Since the sectionalizing circuit breakers 4b and 5b are both open the portion of the distribution circuit adjacent the fault F is completely sectionalized. Although reclosing mechanism could be provided for the sectionalizing circuit breakers, preferably they are only manually reclosed. Consequently after the fault F has been repaired, the sectionalizing circuit breakers 4b and 5b and the transformer circuit breaker 5a are manually reclosed.

Should the opening of the sectionalizing breakers 4a and 5b result in a severe unbalance of the load among the remaining transformers in operation, certain of the remaining sectionalizing circuit breakers may open as previously explained to prevent cascading of the remaining closed transformer circuit breakers.

Figure 6:
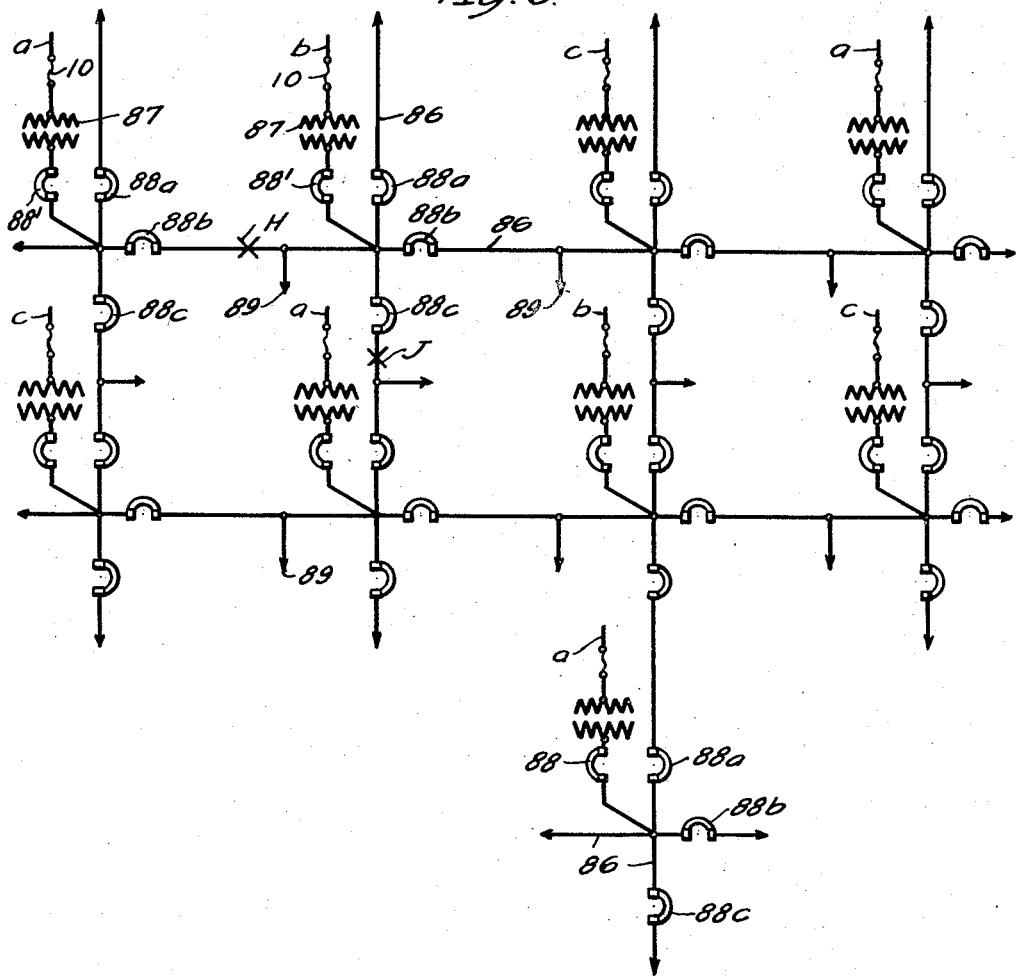
Fig. 6 is a schematic single line view of a network distribution system embodying the invention.

In Fig. 6, the invention is illustrated as applied to a network distribution system. This system includes a plurality of secondary mains 86 which are interconnected at spaced points to form a secondary network circuit or grid. At each of the points of intersection a feeder circuit is connected through a network transformer 87 and a transformer circuit breaker 88 or 88'. As illustrated in Fig. 6, the secondary network circuit is designed to be energized from a plurality of feeder circuits a, b and c. Each of the feeder circuits has a plurality of transformer circuit breakers 88 and 88' associated therewith, these transformers and transformer circuit breakers being distributed properly to provide a satisfactory distribution of load among the transformers of any feeder circuit when one or more of the remaining feeder circuits are out of service. Each of the transformer circuit breakers has associated with it a plurality of sectionalizing circuit breakers 88a, 88b and 88c. The transformer circuit breaker 88 or 88' is similar to the circuit breaker 4a of Fig. 2 and is operated in the same manner. The sectionalizing circuit breakers 88a, 88b and 88c all are similar to the sectionalizing circuit breaker 4b of Fig. 2 and are operated in the same manner from the associated transformer circuit breaker 88 or 88'. If desired, each circuit breaker 88 or 88' and its associated sectionalizing circuit breakers 88a, 88b and 88c may be enclosed in a common transformer tank in a manner analogous to that discussed for Fig. 2. It will be noted in Fig. 6 that load circuits 89 are connected to the secondary mains 86 at any desired points.

It is believed that the operation of the system illustrated in Fig. 6 is apparent from a description of the operation of the system illustrated in Fig. 5. If a fault occurs on one of the feeder circuits associated with the system of Fig. 6, such as the feeder circuit a, all of the transformer circuit breakers 88 and 88' associated with that faulty feeder circuit are tripped by their directional relays. If the feeder circuit fault clears prior to expiration of the reclosing cycle of the associated circuit breakers, the circuit breakers 88 and 88' associated with the feeder circuit a reclose to restore the feeder circuit to operation.

If a fault occurs on one of the secondary mains 86, as at the point H which is adjacent the transformer circuit breakers 88', fault currents flow through the various circuit breakers which are largest in the adjacent circuit breakers 88'. Consequently, the bimetallic elements 20 associated with the circuit breakers 88' are first to engage the contacts 26 and 27 to trip their associated sectionalizing circuit breakers 88a, 88b and 88c. Such operation disconnects the transformer circuit breaker 88' to the left of the fault H, as viewed in Fig. 6, from the fault and this transformer circuit breaker consequently remains closed to continue the supply of electrical energy to its point of intersection of the secondary mains. However, the transformer circuit breaker 88' to the right of the fault H is still connected thereto. Consequently if the fault H fails to clear prior to the time delay of the associated bimetallic element, this transformer circuit breaker also trips to disconnect its associated transformer 87 from the secondary network circuit. At the same time the lockout relay of this transformer circuit breaker drops to prevent reclosure thereof. Consequently the entire secondary network circuit remains in operation except for the small section adjacent the fault H. Furthermore, all transformers remain in service except for the one transformer at the immediate right of the fault H, as viewed in Fig. 6. After the fault H has been repaired, the six tripped sectionalizing circuit breakers and the one tripped transformer circuit breaker may be manually reclosed to restore the entire system to operation.

Under some conditions, the sectionalizing circuit breakers 88c may be omitted. This would mean that the transformer circuit breaker 88' which tripped in response to the fault H, also would have to trip to clear a fault J occurring in the area which would have been cleared by operation of the sectionalizing circuit breakers 88c.

Although the invention has been disclosed with reference to certain specific embodiments thereof, numerous modifications are possible. Therefore, the invention is to be restricted only by the appended claims.

I claim as my invention:

1. In an electrical distribution system, a distribution circuit, a plurality of energizing sources for said distribution circuit, said energizing sources being connected to said distribution circuit at spaced points, means responsive to an abnormal condition of a quantity supplied by one of said energizing sources for segregating said distribution circuit between said one energizing source and other of said energizing sources, and means effective only after said segregation of said distribution circuit and responsive to said abnormal condition for disconnecting said one of said energizing sources from said distribution circuit.

2. In an electrical distribution system, an electrical distribution circuit, a first circuit breaker associated with said electrical distribution circuit for connecting and disconnecting first portions of said distribution circuit relative to each other, a second circuit breaker associated with said electrical distribution circuit for connecting and disconnecting second portions of said distribution circuit relative to each other, and common control means responsive to a variable quantity in said distribution circuit for operating both of said circuit breakers, said control means comprising means operable from a first condition to a second condition for operating said first circuit breaker, and operable from said second condition to a third condition for operating said second circuit breaker.

3. In an electrical distribution system, a distribution circuit, means for supplying electrical energy to said distribution circuit including a plurality of transformers having secondary windings connected to said distribution circuit, a separate transformer circuit breaker for connecting and disconnecting each of said transformers relative to said distribution circuit, a sectionalizing circuit breaker for disconnecting the distribution circuit connection between two of said transformers, and control means responsive to a quantity passing through one of said two transformers for tripping said sectionalizing circuit breaker, said control means including means responsive to said quantity and effective only after said control means is in condition to trip said sectionalizing circuit breaker for tripping the transformer circuit breaker associated with one of said two transformers.

4. In an electrical distribution system, a plurality of transformers each having a secondary winding, tie means connecting said secondary windings in parallel, a sectionalizing circuit breaker in said tie means between each pair of secondary windings for segregating the secondary windings on opposite sides of the sectionalizing circuit breaker from each other, a separate transformer circuit breaker connecting each of said secondary windings to said tie means, said circuit breakers being arranged in pairs each including a transformer circuit breaker and an adjacent sectionalizing circuit breaker, and a separate control means for each of said transformers, each of said control means including operating means operable successively into two conditions in response to current flowing through the associated transformer, means responsive to the first condition of said operating means for tripping the associated sectionalizing circuit breaker, and means responsive to the second condition of said operating means for tripping the associated transformer circuit breaker.

5. In an electrical distribution system, a plurality of transformers each having a secondary winding, tie means connecting said secondary windings in parallel, a sectionalizing circuit breaker in said tie means between each pair of secondary windings for segregating the secondary windings on opposite sides of the sectionalizing circuit breaker from each other, a separate transformer circuit breaker connecting each of said secondary windings to said tie means, said circuit breakers beng arranged in pairs each including a transformer circuit breaker and an adjacent sectionalizing circuit breaker, and a separate control means for each of said transformers, each of said control means including operating means operable successively into two conditions in response to current flowing through the associated transformer, said operating means operating with inverse time delay into the first of said two conditions, means responsive to the first condition of said operating means for tripping the associated sectionalizing circuit breaker, and means responsive to the second condition of said operating means for tripping the associated transformer circuit breaker.

6. In an electrical distribution system, a distribution circuit, a plurality of energizing sources for said distribution circuit, said energizing sources being connected to said distribution circuit at spaced points, means responsive to current supplied by one of said energizing sources and effective after a time delay for disconnecting said distribution circuit between said one energizing source and other of said sources, said current responsive means including means effective after said time delay for disconnecting said one energizing source from said distribution circuit, and means responsive to the direction of energy flow in said one energizing source for disconnecting said one energizing source from said distribution circuit, said last-named means having an operating time less than said time delay.

7. In an electrical distribution system, a network circuit, a plurality of feeder circuits for energizing said network circuit, at least one separate transformer for coupling each of said feeder circuits to said network circuit, a separate transformer circuit breaker for controlling the connection of each of said transformers to said network circuit, a separate sectionalizing circuit breaker in said network circuit between each pair of points of connection thereto of said transformers, said circuit breakers being arranged in groups each including a transformer circuit breaker and at least one adjacent sectionalizing circuit breaker, means responsive to the condition of said system when a fault occurs on said network circuit and effective after a time delay for tripping the sectionalizing circuit breaker or breakers near said fault, means responsive to the condition of said system if said fault persists after said tripping of said sectionalizing circuit breaker or breakers for tripping the transformer circuit breaker or breakers connected to the faulty portion of said network circuit, and means responsive to the condition of said system when a fault occurs on a feeder circuit for tripping the transformer circuit breaker or breakers associated with said faulty feeder circuit, said last-named means operating in a time less than said time delay.

8. In an electrical distribution system, a network circuit, a plurality of feeder circuits for energizing said network circuit, at least one separate transformer for coupling each of said feeder circuits to said network circuit, a separate transformer circuit breaker for controlling the connection of each of said transformers to said network circuit, a separate sectionalizing circuit breaker in said network circuit between each pair of points of connection thereto of said transformers, said circuit breakers being arranged in groups each including a transformer circuit breaker and at least one adjacent sectionalizing circuit breaker, and control means responsive to current flowing through one of said transformers and effective after an inverse time delay for tripping the associated sectionalizing circuit breaker or breakers, said control means including means responsive to said current only after said tripping operation for tripping the associated transformer circuit breaker, and means responsive to the direction of energy flow through said transformer for tripping the associated transformer circuit breaker, said last-named means having an operating time less than said time delay.

9. In an electrical distribution system, a network circuit, a plurality of feeder circuits for energizing said network circuit, at least one separate transformer for coupling each of said feeder circuits to said network circuit, a separate transformer circuit breaker for controlling the connection of each of said transformers to said network circuit, a separate sectionalizing circuit breaker in said network circuit between each pair of points of connection thereto of said transformers, said circuit breakers being arranged in groups each including a transformer circuit breaker and at least one adjacent sectionalizing circuit breaker, means responsive to the condition of said system when a fault occurs on said network circuit and effective after a time delay for tripping the sectionalizing circuit breaker or breakers near said fault, means responsive to the condition of said system if said fault persists after said tripping of said sectionalizing circuit breaker or breakers for tripping the transformer circuit breaker or breakers connected to the faulty portion of said network circuit, means responsive to the condition of said system when a fault occurs on a feeder circuit for tripping the transformer circuit breaker or breakers associated with said faulty feeder circuit, said last-named means operating in a time less than said time delay, reclosing means for said transformer circuit breaker, and means rendering said reclosing means ineffective for reclosing operations when said transformer circuit breakers trip for faults occurring in said network circuit.

10. In an electrical distribution system, a network circuit, a plurality of feeder circuits for energizing said network circuit, at least one separate transformer for coupling each of said feeder circuits to said network circuit, a separate transformer circuit breaker for controlling the connection of each of said transformers to said network circuit, a separate sectionalizing circuit breaker in said network circuit between each pair of points of connection thereto of said transformers, said circuit breakers being arranged in groups each including a transformer circuit breaker and at least one adjacent sectionalizing circuit breaker, and control means responsive to current flowing through one of said transformers and effective after an inverse time delay for tripping the associated sectionalizing circuit breaker or breakers, said control means including means responsive to said current only after said tripping operation for tripping the associated transformer circuit breaker, means responsive to the direction of energy flow through said transformer for tripping the associated transformer circuit breaker, said last-named means having an operating time less than said time delay, reclosing means for said transformer circuit breaker, and means for rendering said reclosing means ineffective when said transformer circuit breakers are tripped in response to said current.

11. In a network electrical distribution system, a secondary network circuit comprising a plurality of secondary means interconnected at a plurality of points, a plurality of feeder circuits for energizing said secondary network circuit, a plurality of transformers for coupling each of said feeder circuits to said secondary network circuit and a separate group of circuit breakers for controlling the connection of each of said transformers to said secondary network circuit, each of said groups of circuit breakers comprising a transformer circuit breaker connecting the associated transformer to a separate point of interconnection of said secondary mains, a plurality of sectionalizing circuit breakers, each of said sectionalizing circuit breakers being disposed in a separate secondary main radiating from the associated point of interconnection of said secondary mains, control means responsive to current flowing through the associated transformer for operation successively into a first condition and a second condition, means responsive to the first condition of said control means for tripping the sectionalizing circuit breakers, and means responsive to the second condition of said control means for tripping said transformer circuit breaker.

12. In a network electrical distribution system, a secondary network circuit comprising a plurality of secondary mains interconnected at a plurality of points, a plurality of feeder circuits for energizing said secondary network circuit, a plurality of transformers for coupling each of said feeder circuits to said secondary network circuit and a separate group of circuit breakers for controlling the connection of each of said transformers to said secondary network circuit; each of said groups of circuit breakers comprising a transformer circuit breaker connecting the associated transformer to a separate point of interconnection of said secondary mains, a plurality of sectionalizing circuit breakers, each of said sectionalizing circuit breakers being disposed in a separate secondary main radiating from the associated point of interconnection of said secondary mains, control means responsive to current flowing through the associated transformer for operation successively into a first condition and a second condition, means responsive to the first condition of said control means for tripping the sectionalizing circuit breakers, means responsive to the second condition of said control means for tripping said transformer circuit breaker, means responsive to the direction of energy flow in the associated transformer for tripping said transformer circuit breaker, means for reclosing said transformer circuit breaker, and means rendering said reclosing means ineffective for reclosing said transformer circuit breaker following a tripping operation thereof caused by said second condition of said control means.

13. In an electrical distribution unit, a transformer, a first circuit breaker, a circuit connecting the poles of said first circuit breaker to said transformer, a second circuit breaker having its poles in said circuit between said first circuit breaker and said transformer for controlling the connection of said transformer to said first circuit breaker, means responsive to current passing through said transformer for tripping said first circuit breaker, means associated with said first named means for tripping said second circuit breaker after the expiration of a time delay sufficient to permit said tripping of said first circuit breaker, and means responsive to the direction of energy flow in said transformer for tripping said second circuit breaker, said last-named means having an operating time less than that required for said current responsive means to trip said first circuit breaker.

14. In an electrical distribution unit, a transformer, a plurality of circuit breakers having their poles connected to said transformer in series relationship, means responsive to current passing through said transformer for sequentially tripping said circuit breakers in a predetermined sequence, means responsive to the direction of energy flow in said transformer for tripping one of said circuit breakers, means for reclosing said one circuit breaker, and means rendering said last-named means ineffective for a reclosing operation following a tripping operation of said current-responsive means.

15. In an electrical distribution unit, a transformer, a first circuit breaker, a circuit connecting the poles of said first circuit breaker to said transformer, a second circuit breaker having its poles in said circuit between said first circuit breaker and said transformer for controlling the connection of said transformer to said first circuit breaker, means responsive to current passing through said transformer for tripping said first circuit breaker, means associated with said first-named means for tripping said second circuit breaker after the expiration of a time delay sufficient to permit said tripping of said first circuit breaker, means responsive to the direction of energy flow in said transformer for tripping said second circuit breaker, said last-named means having an operating time less than that required for said current responsive means to trip said first circuit breaker, means for reclosing said second circuit breaker, and means responsive to operation of said current-responsive means for rendering said reclosing means ineffective.

16. In an electrical distribution unit, a transformer, a housing enclosing said transformer, an insulating medium in said housing for insulating said transformer, a plurality of circuit breakers associated with said transformer, and control means including thermally responsive means responsive to current passing through said transformer for tripping said circuit breakers in a predetermined sequence, said thermally responsive means being positioned to receive heat from said insulating medium.

17. In an electrical distribution unit, a transformer, a housing enclosing said transformer, an insulating medium in said housing for insulating said transformer, said insulating medium being adapted to receive heat from said transformer, an electrical circuit connected to said transformer, a plurality of circuit breakers positioned in said housing for controlling said electrical circuit, control means including thermally responsive means positioned in said insulating medium for tripping said circuit breakers in a predetermined sequence, said thermally responsive means being disposed for receiving heat from said insulating medium, and means for heating said thermally responsive means in accordance with current passing through said transformer.

ROYAL C. BERGVALL.